(12) United States Patent
Hansen et al.

(10) Patent No.: US 9,487,066 B1
(45) Date of Patent: Nov. 8, 2016

(54) DEFORMABLE SIDE IMPACT BAR

(71) Applicant: Toyota Motor Engineering & Manufacturing North America, Inc., Erlanger, KY (US)

(72) Inventors: Charles S. Hansen, Northville, MI (US); Todd R. Muck, Fowlerville, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/793,042

(22) Filed: Jul. 7, 2015

(51) Int. Cl.
*B60J 5/04* (2006.01)
*B62D 25/04* (2006.01)

(52) U.S. Cl.
CPC ............ *B60J 5/0461* (2013.01); *B60J 5/0425* (2013.01); *B60J 5/0437* (2013.01); *B62D 25/04* (2013.01)

(58) Field of Classification Search
CPC .......... B60J 5/04; B60J 5/0412; B60J 5/042; B60J 5/0422; B60J 5/0423; B60J 5/0425; B60J 5/0427; B60J 5/0429; B60J 5/043; B60J 5/0438; B60J 5/0441; B60J 5/0443; B60J 5/0444; B60J 5/0448; B60J 5/0456; B60J 5/0458; B60J 5/0461; B60J 5/0437; B62D 25/04
USPC .............................. 296/146.5, 146.6, 187.12
See application file for complete search history.

(56) References Cited

U.S. PATENT DOCUMENTS

| | | | | |
|---|---|---|---|---|
| 4,861,097 A * | 8/1989 | Wycech | ................. | B60J 5/0437 296/146.6 |
| 5,094,034 A * | 3/1992 | Freeman | ................. | B60J 5/0437 296/146.6 |
| 5,224,752 A * | 7/1993 | Marshall | ................. | B60J 5/0426 292/144 |
| 5,314,228 A * | 5/1994 | Figge, Sr. | ............... | B60J 5/0447 296/146.6 |
| 5,481,831 A * | 1/1996 | Heim | ..................... | B01D 17/00 296/146.6 |
| 5,580,120 A | 12/1996 | Nees et al. | | |
| 6,039,387 A * | 3/2000 | Choi | ..................... | B60J 5/0427 296/146.6 |
| 6,135,537 A | 10/2000 | Giddons | | |
| 6,196,619 B1 * | 3/2001 | Townsend | ............. | B60J 5/0444 296/146.6 |
| 6,364,398 B1 * | 4/2002 | Kim | ..................... | B60J 5/0443 296/146.6 |
| 6,601,910 B1 * | 8/2003 | Duggan | ................. | B60J 5/0426 296/146.6 |
| 6,817,652 B2 | 11/2004 | Graber et al. | | |
| 6,869,130 B2 | 3/2005 | Bodin et al. | | |
| 7,059,654 B2 * | 6/2006 | Ichinose | ................ | B60J 5/0479 292/340 |
| 7,331,626 B2 | 2/2008 | Yoshimoto et al. | | |
| 7,347,486 B2 | 3/2008 | Uchida et al. | | |
| 7,530,628 B2 * | 5/2009 | Gabler | ................... | B60J 5/0437 296/146.6 |
| 7,735,901 B2 * | 6/2010 | Melz | ....................... | B60J 5/043 296/146.6 |
| 8,267,464 B2 * | 9/2012 | Konchan | ............... | B60J 5/0479 292/150 |
| 8,419,111 B2 | 4/2013 | Uchida et al. | | |
| 8,540,306 B2 | 9/2013 | Han | | |
| 2002/0093219 A1 * | 7/2002 | Traister | ................. | B60J 5/0433 296/146.6 |
| 2003/0042753 A1 * | 3/2003 | Achleitner | ............ | B62D 25/04 296/146.6 |

(Continued)

*Primary Examiner* — Gregory Blankenship
(74) *Attorney, Agent, or Firm* — Dinsmore & Shohl LLP

(57) ABSTRACT

A door assembly for a vehicle is provided having a door positioned between a first pillar and a second pillar, the first pillar having a first surface, the second pillar having a second surface. A bar is contained within the door, the bar having a first end and a second end, the bar extending between the first pillar and the second pillar, the bar at least partially bowed as defined by a first position. In the event of a collision, the bar moves to a second position where the bar is extended, the second position further defined when the first end of the bar is in contact with the first surface and the second end of the bar is in contact with the second surface of the pillar thereby distributing the force to the first pillar and the second pillar.

20 Claims, 2 Drawing Sheets

(56) References Cited

U.S. PATENT DOCUMENTS

| | | | |
|---|---|---|---|
| 2004/0036316 A1* | 2/2004 | Bodin | B60J 5/0437 296/146.6 |
| 2007/0052259 A1* | 3/2007 | Roccato | B60J 5/0458 296/187.03 |
| 2010/0013266 A1 | 1/2010 | Nakano et al. | |
| 2011/0308168 A1 | 12/2011 | Yasuhara et al. | |
| 2012/0091750 A1* | 4/2012 | Danaj | B60J 5/0443 296/146.6 |
| 2013/0074413 A1 | 3/2013 | Moriya et al. | |
| 2013/0140845 A1* | 6/2013 | Jeon | B60J 5/0437 296/146.6 |
| 2013/0328352 A1 | 12/2013 | Kato et al. | |
| 2014/0062123 A1* | 3/2014 | Suesada | B60J 5/0443 296/146.6 |
| 2014/0110964 A1* | 4/2014 | Schijve | B29C 45/006 296/146.6 |
| 2014/0339855 A1 | 11/2014 | Torii | |
| 2014/0375078 A1* | 12/2014 | Fujihara | B60J 5/0443 296/146.6 |
| 2015/0367715 A1* | 12/2015 | Inamoto | B60J 5/0429 296/146.6 |

* cited by examiner

US 9,487,066 B1

DEFORMABLE SIDE IMPACT BAR

FIELD OF THE INVENTION

The present invention relates generally to strengthening components within a vehicle. More particularly, the present invention relates to a side impact bar for a vehicle door.

BACKGROUND OF THE INVENTION

It is known in the art to provide a side door bar that is straight extending between the flange portions of a door. However, in the event of a collision, such as a side impact collision, the bar deforms and pulls away from the door flange. The bar moves from a straight position to a dramatically bowed position into the vehicle. In some instances, the bar deforms so dramatically that the bar may extend into the vehicle cabin where the user is sitting. This arrangement provides an inconvenience to the user and does not provide great strength to the vehicle door to prevent damage to the vehicle door during a collision.

By way of example, an assembly of the prior art, as illustrated in FIG. 1, includes a bar movable from a first position to a second position. The bar 12 is adapted to rest on flanges. In the event of a collision with an external force, the bar moves from a first position 12A to a second bowed position 12B. After the collision, the bar deforms into the vehicle thereby causing a large intrusion into the vehicle. Accordingly, there exists a need in the art to provide an improved side door bar for a vehicle.

SUMMARY OF THE INVENTION

A door assembly for a vehicle is provided having a door positioned between a first pillar and a second pillar, the first pillar having a first surface, the second pillar having a second surface. A bar is contained within the door, the bar having a first end and a second end, the bar extending between the first pillar and the second pillar, the bar at least partially bowed as defined by a first position. In the event of a collision, the bar moves to a second position where the bar is extended, the second position further defined when the first end of the bar is in contact with the first surface and the second end of the bar is in contact with the second surface of the pillar thereby distributing the force to the first pillar and the second pillar.

In one embodiment, in the second position, the first end and the second end of the bar are spaced apart from the first surface and the second surface. In a preferred embodiment, the bar is bowed towards the exterior of the vehicle when in the bowed position. In the event of a collision, the bar moves towards a second extended position (i.e. towards a straight configuration, less bowed). The indentations of the first pillar and the second pillar are angled thereby allowing the door to open after a collision.

Further, at least one bracket is connected to the bar, the bracket positioned between the interior of the door and the bar. Preferably, at least two brackets are connected to opposing sides of the bar. In the event of a collision, the bracket moves from a first position to a second position as the bar moves from the first position to the second position. In this event, the bracket moves towards one of the first pillar or the second pillar.

DETAILED DESCRIPTION OF THE INVENTION

The present invention provides for a door bar and corresponding door assembly for a vehicle. The bar is contained within the door and is positioned between a first pillar and a second pillar. In a first position, the bar is bowed towards the exterior of the vehicle. In the event of a collision, the bar moves towards a straightened position and the free ends of the bar make contact with the first pillar and the second pillar to distribute the load and strengthen the door.

Figure 2:
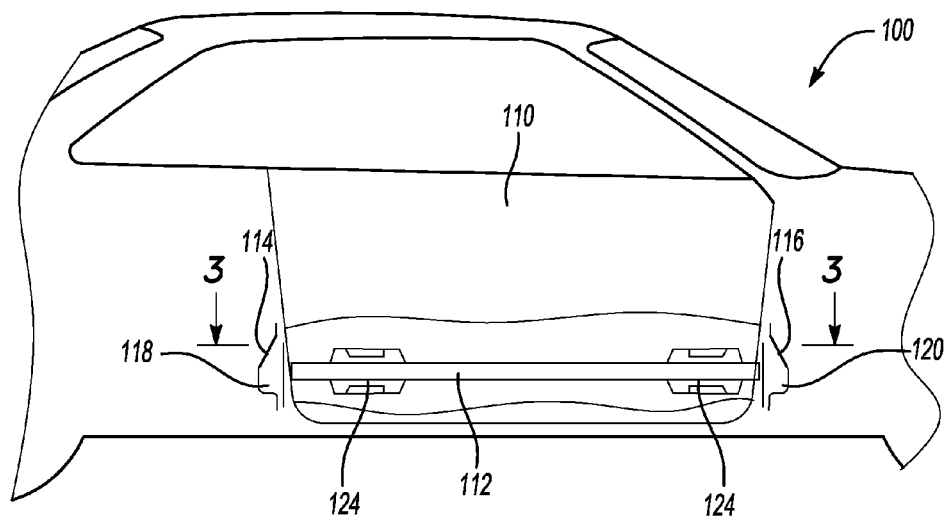
FIG. 2 illustrates an environmental view of the present invention of a door bar installed within the vehicle.
Figure 3:
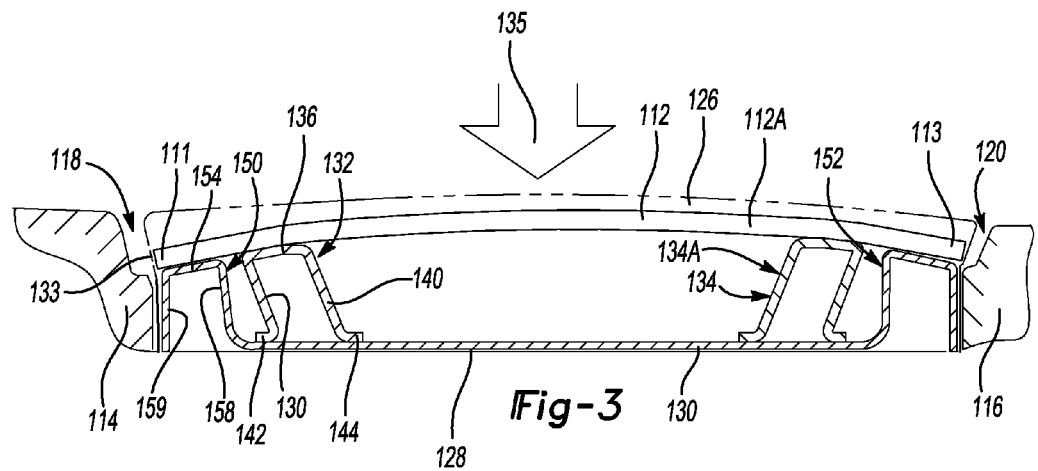
FIG. 3 illustrates a cross-sectional view of the door bar of the present invention.
Figure 4:
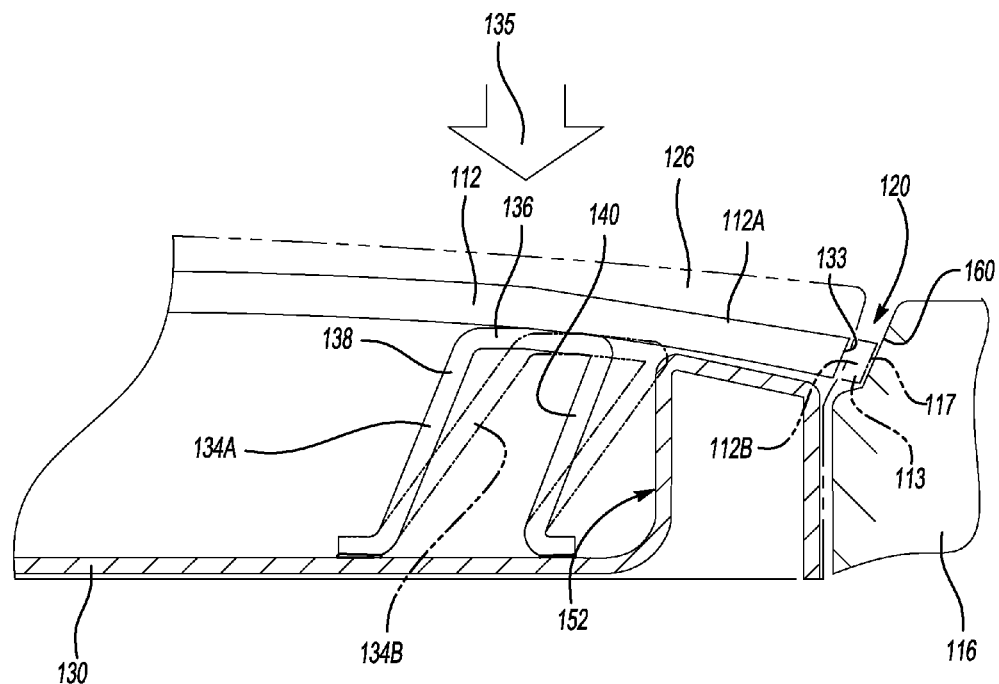
FIG. 4 illustrates a close-up view of the door and bracket of the present invention in a first position and a second position after a collision.

FIGS. 2-4 illustrate the improved door assembly having a door bar extending between the first pillar and the second pillar. The vehicle 100 includes a vehicle door 110. A bar 112 is provided extending between a first pillar 114 and a second pillar 116. In the current example as illustrated in FIGS. 2-4, the first pillar 114 is the B pillar and the second pillar 116 is the A pillar. The first pillar 114 includes an indentation 118 operable to accept a free end of the bar 112. The second pillar 116 includes an indentation 120 adapted to accept the other free end of the bar 112. The bar 112 is connected to two brackets 124 adapted to support and move with the bar in the event of a collision.

The bar 112 is shown in a first position 112A in FIG. 3 and in FIG. 4. The bar 112 includes a first end 111 and a second end 113. The first end 111 is adapted to connect with the first pillar 114 after a collision. In the event of a collision, the first end 111 extends through an aperture 133 in the door 110 and moves into the indentation 118 of the first pillar 114. The aperture 133 is provided on the side of the door 110. Specifically, the aperture 133 extends through a side panel on the side of the door 110.

The bar 112 includes the second end 113 adapted to move into the indentation 120 of the second pillar 116. The movement is the same as compared to the first end 111.

The bar 112 is further connected to two deformable brackets 132, 134. The brackets 132, 134 are made of a steel, aluminum, or other suitable material capable of bending and deforming under pressure. The bracket 132 includes an upper portion 136 adapted to connect to the bar 112. The upper portion 136 of the bracket 132 is welded to an underside portion of the bar 112. The bracket 132 further includes side portions 138, 140 which are movable from a first position to a second position in the event of a collision. The bracket 132 further includes connector portions 142, 144 adapted to connect to the door flange. The corresponding bracket 134 further includes the same components as bracket 132. The door body panel 130 includes flanges 150, 152. The bar 112 is adapted to rest on an upper surface 154 of the flange 150. The flange 150 further includes side members 156, 158 extending towards the interior of the vehicle to further support the flange 150. In the event of a collision, the bar 112 is adapted to slide on an upper surface of the upper surface 154 of the flange 150.

The movement before and after a collision is illustrated in FIG. 4. A force arrow 135 is provided to illustrate a side impact force, such as a T-boned vehicle, in a collision. The bar 112 is shown in (first) position 112A and (second) position 112B. Position 112A is before a collision has occurred. In this position, the bar 112 is fully contained within a door 126. The bar 112 is welded to the bracket 134A at the upper portion 136 of the bracket. The side portions 138, 140 of the bracket 134 are slightly angled but generally in a vertical arrangement with respect to the body panel 130. After a collision the bar 112 is illustrated in the position 112B. The second end 113 of the bar 112 is moved through the aperture 133 of the door 126. The second end 113 of the bar 112 moves into contact with the second pillar 116. The second end 113 of the bar 112 moves into the indentation 120 of the second pillar 116. The second pillar 116 includes an angled surface 160 having an angled surface away from the flange 152.

An end surface 117 of the bar 112 moves into direct contact with the angled surface 160 of the second pillar 116. The surface 117 directly abuts the angled surface 160 after a collision to add strength to the bar 112. Similarly, on the other side of the bar 112 at the end 111, the end 111 of the bar 112 moves into direct contact with the angled surface of the first pillar 114 (not shown but the same configuration as illustrated in FIG. 4 of the second end). This abutment of the end 113 to the second pillar 116 distributes the load between the first and second pillars 114, 116 thereby increasing the overall strength of the bar assembly.

The angled surface 160 is angled to allow the vehicle door to open after a collision. The angled surface 160 allows the bar 112 and more particularly the second end 113 (and corresponding first end 111) to rotate out of the indentation without being impeded from movement by the pillar 116.

Figure 1:
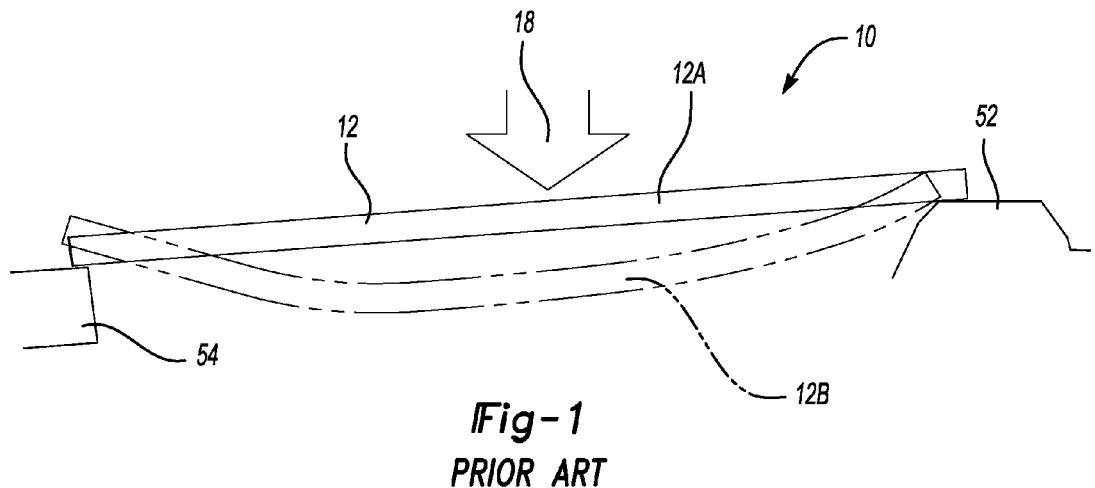
FIG. 1 illustrates a cross-sectional view of a bar of the prior art in a first position and a second position after a collision.

In comparison to the prior art, the bar 112 of the present invention adds strength as compared to the bar of the prior art. By way of example, the assembly 10 of the prior art, as illustrated in FIG. 1, includes a bar 12 movable from a first position 12A to a second position 12B. The bar 12 is adapted to rest on flanges 54, 52. In the event of a collision with an external force 18 the bar moves from a first position 12A to a second bowed position 12B. After the collision, the bar deforms into the vehicle thereby causing a large intrusion into the vehicle.

The present invention improves the prior art in that it uses the strength of existing vehicle pillars to increase safety in the vehicle.

To summarize, the door assembly for a vehicle is provided having the door positioned between the first pillar and the second pillar, the first pillar having the first surface, the second pillar having the second surface. The bar is contained within the door, the bar having the first end and the second end, the bar extending between the first pillar and the second pillar, the bar at least partially bowed as defined by the first position. In the event of a collision, the bar moves to the second position where the bar is extended, the second position further defined when the first end of the bar is in contact with the first surface and the second end of the bar is in contact with the second surface of the pillar thereby distributing the force to the first pillar and the second pillar.

In one embodiment, in the second position, the first end and the second end of the bar are spaced apart from the first surface and the second surface. In a preferred embodiment, the bar is bowed towards the exterior of the vehicle when in the bowed position. In the event of a collision, the bar moves towards a second extended position (i.e. towards a straight configuration, less bowed). The indentations of the first pillar and the second pillar are angled thereby allowing the door to open after a collision.

Further, the at least one bracket is connected to the bar, the bracket positioned between the interior of the door and the bar. In a preferred embodiment, the brackets and the bar is made of steel. Preferably, at least two brackets are connected to opposing sides of the bar. In the event of a collision, the bracket moves from a first position to a second position as the bar moves from the first position to the second position. In this event, the bracket moves towards one of the first pillar or the second pillar.

In other embodiments, the support system is used in other places other than the door. In those embodiments, a support system for a vehicle having a first pillar having a first surface and a second pillar having a second surface. A bar extends between the first pillar and the second pillar, the bar having a first end and a second end, the bar at least partially bowed as defined by a first position. By way of example, a bar may be provided between the B and C pillars of a vehicle adjacent to the rear seat in a 2-door vehicle. In the event of a collision, the bar moves to a second position where the bar is extended, the second position further defined when the first end of the bar is in contact with the first surface and the second end of the bar is in contact with the second surface of the pillar thereby distributing the force to the first pillar and the second pillar.

The invention is not restricted to the illustrative examples and embodiments described above. The embodiments are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

We claim:

1. A door assembly for a vehicle comprising:
   a first pillar and a second pillar, the first pillar having a first surface, the second pillar having a second surface;
   a door positioned between the first pillar and the second pillar;
   a bar contained within the door, the bar having a first end and a second end, the bar extending in a direction between the first pillar and the second pillar, the bar at least partially bowed in a first position; and
   a deformable bracket connected to the bar at a location between and spaced from the first end and the second end of the bar;
   wherein in the event of a collision, the bar moves to a second position where the bar is extended, the second position further defined when the first end of the bar is in contact with the first surface and the second end of the bar is in contact with the second surface of the pillar thereby distributing the force to the first pillar and the second pillar.

2. The door assembly of claim 1 wherein, in the first position, the first end and the second end of the bar are spaced apart from the first surface and the second surface.

3. The door assembly of claim 1 wherein the bar is bowed towards the exterior of the vehicle when in the bowed first position.

4. The door assembly of claim 1 wherein an indentation is provided in each of the first pillar and the second pillar, each indentation being angled thereby allowing the door to open after a collision.

5. The door assembly of claim 1 wherein the deformable bracket is connected to the bar, the deformable bracket positioned between the interior of the door and the bar.

6. The door assembly of claim 5 wherein two deformable brackets are provided.

7. The door assembly of claim 5 where the deformable bracket moves from a first position to a second position as the bar moves from the first position to the second position.

8. The door assembly of claim 1 wherein an aperture is provided on the door to allow the bar to travel towards one of the first pillar or the second pillar when the bar moves towards the second position.

9. The door assembly of claim 1, wherein the deformable bracket is attached to a door body panel at a location between the first and second pillars.

10. A support system for a vehicle comprising:
a first pillar having a first surface;
a second pillar having a second surface;
a bar extending between the first pillar and the second pillar, the bar having a first end and a second end, the bar at least partially bowed as defined by a first position; and
a deformable bracket connected to the bar at a location between and spaced from the first end and the second end of the of the bar;
wherein in the event of a collision, the bar moves to a second position where the bar is extended, the second position further defined when the first end of the bar is in contact with the first surface and the second end of the bar is in contact with the second surface of the pillar thereby distributing the force to the first pillar and the second pillar.

11. The support system of claim 10 wherein, in the first position, the first end and the second end of the bar are spaced apart from the first surface and the second surface.

12. The support system of claim 10 wherein the bar is bowed towards the exterior of the vehicle when in the second position.

13. The support system of claim 10 wherein the indentations of the first pillar and the second pillar are angled thereby allowing a door to open after a collision.

14. The support system claim 10 wherein the deformable bracket is connected to the bar, the deformable bracket positioned between the interior of a door and the bar.

15. The support system of claim 14 wherein two deformable brackets are provided.

16. The support system of claim 14 where the deformable bracket moves from a first position to a second position as the bar moves from the first position to the second position.

17. The support system of claim 10 wherein an aperture is provided on a door to allow the bar to travel towards one of the first pillar or the second pillar when the bar moves towards the second position.

18. The support system of claim 17 wherein the aperture is provided on a side portion of the door.

19. The support system of claim 10 wherein a body panel is provided, the body panel having at least one flange, the bar resting on the at least one flange, the bar slidable across the at least one flange to the second position.

20. The support system of claim 10, wherein the deformable bracket is attached to a door body panel at a location between the first and second pillars.

* * * * *